United States Patent
Tu

(10) Patent No.: US 6,378,365 B1
(45) Date of Patent: Apr. 30, 2002

(54) MICROMACHINED THERMAL FLOWMETER HAVING HEATING ELEMENT DISPOSED IN A SILICON ISLAND

(75) Inventor: Xiangzheng Tu, Beijing (CN)

(73) Assignee: Eulite Laboratories Inc., Taipei (TW)

( * ) Notice: Subject to any disclaimer, the term of this patent is extended or adjusted under 35 U.S.C. 154(b) by 0 days.

(21) Appl. No.: 09/450,498

(22) Filed: Nov. 30, 1999

Related U.S. Application Data

(63) Continuation-in-part of application No. 08/916,924, filed on Aug. 22, 1997, now abandoned.

(51) Int. Cl.[7] ................................................. G01F 1/68
(52) U.S. Cl. ...................................................... 73/204.26
(58) Field of Search ........................ 73/204.26, 204.24, 73/204.25

(56) References Cited

U.S. PATENT DOCUMENTS 6,139,758 A * 10/2000 Tu ................................. 216/2

* cited by examiner

Primary Examiner—Harshad Patel
(74) Attorney, Agent, or Firm—Rosenberg, Klein & Lee

(57) ABSTRACT

A micromachined thermal flowmeter comprises characteristically at least one crystal silicon island jutted into the flow of a fluid to be determined which are embedded in an elastic low thermal conductivity layer supported by a rigid low thermal conductivity plate having a heating element and a pair of thermal sensing elements formed therein.

6 Claims, 6 Drawing Sheets

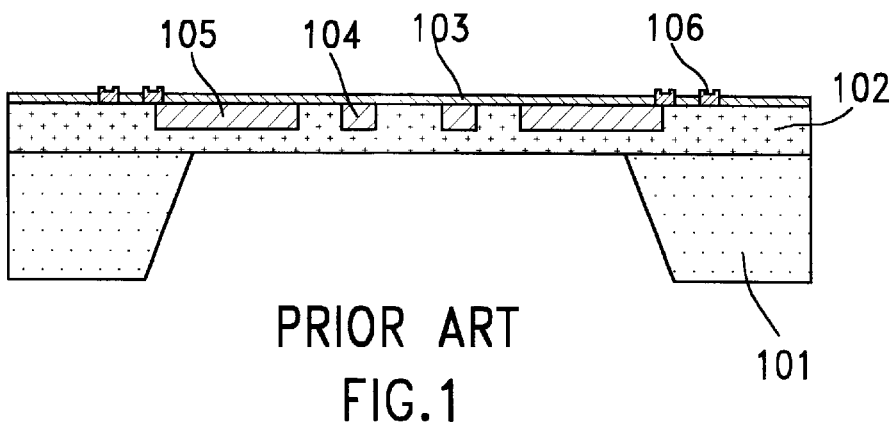
PRIOR ART
FIG.1
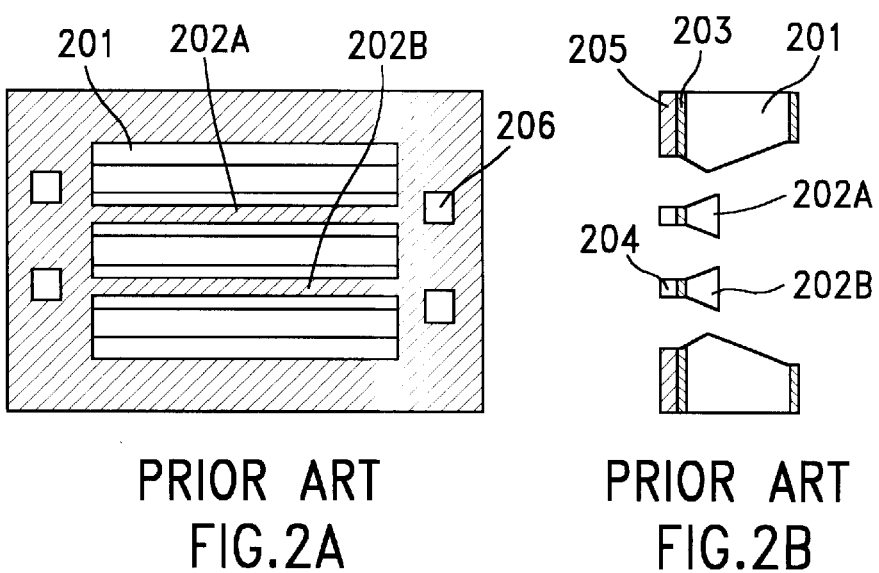
PRIOR ART
FIG.2A
PRIOR ART
FIG.2B
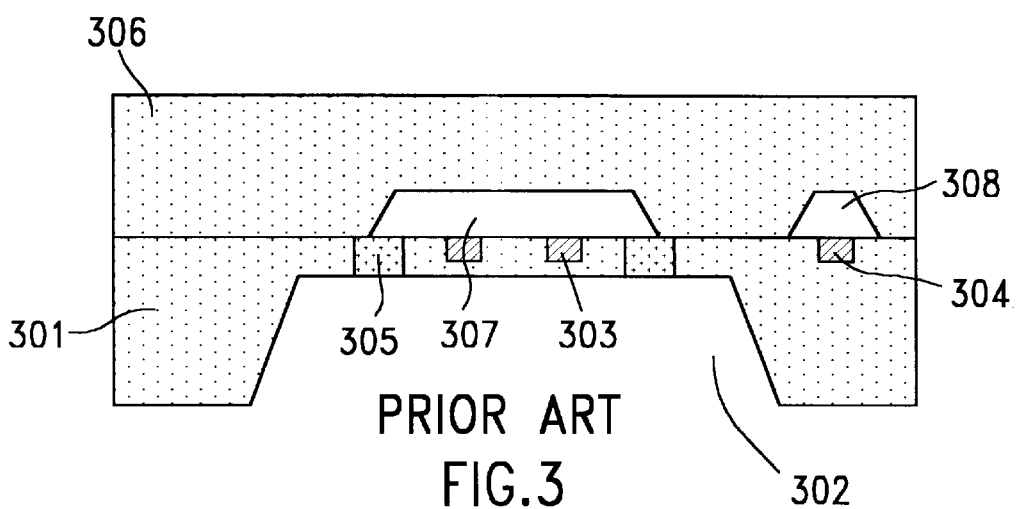
PRIOR ART
FIG.3

MICROMACHINED THERMAL FLOWMETER HAVING HEATING ELEMENT DISPOSED IN A SILICON ISLAND

CROSS-REFERENCE TO RELATED APPLICATIONS

This application is a Continuation-in-Part Application of application Ser. No. 08/916,924, filed Aug. 22, 1997, entitled Micromachined Thermal Flowmeter with Thermal Sensing Means Formed in a Thin Crystal Silicon Island, and the Micromachining Method for Manufacturing now abandoned.

BACKGROUND OF THE INVENTION

1. Field of the Invention

The invention relates to micromachined thermal flowmeters for measuring the flow rate of a flowing fluid, e.g. a liquid or a gas. More particularly, the present invention is directed to a micromachined thermal flowmeter having the thermal sensing means formed in a thin single crystal silicon island, which the crystal silicon island which the crystal silicon is jutted into the flow of the fluid to be measured for increasing the sensitivity and accuracy.

2. Prior Art

In general, a micromachined thermal flowmeter is operated based on the principle of a well-known, hot-wire anemometer and fabricated by using modem silicon integrated circuit (IC) technology. Such a flowmeter offers many advantages including small size, low input power, high sensitivity, fast response, ability for integration, and easiness for batch production. The flowmeters have found an ever-increasing variety of applications such a, for instance, process control in the chemical or semiconductor industries, air conditioning and building control, combustion control in engines and furnaces, and medical measurements.

Over the last ten years several types of the micromachined thermal flowmeters have been developed.

In the first type, a thermopile gas flowmeter uses a thin single crystal member structure micromachined in a silicon substrate for providing high thermal isolation, as shown in FIG. 1. A heating resistor (104) is disposed in the central region of the membrane (102). A thermopile consists of 20 aluminum/polysilicon thermocouples (105) placed on the membrane (102). The "hot" contacts are positioned near the heating resistor (104) at the tip of the membrane (102), the "cold" contacts are located on the bulk silicon (101). The flowmeter also comprises a passivation layer (103) and a metallization pattern including bonding pads (106).

This type of flowmeter suffers the following problems:
(1) The thin membrane of the flowmeter is easy to damage under the conditions of higher air flow loading and bombardment of particulate matter.
(2) The fluid flow to be measured is easy to be disturbed by the opening on the surface of the membrane adapted to allow the fluid passing over.
(3) The flowmeter cannot be used for liquid because the liquid filled in the opening would reduce the thermal resistance between the cantilever beam and the bulk silicon.
(4) The flowmeter cannot be used in corrosion environment, because the back side of the thin membrane has no protecting layer thereon.

In the second type, a flowmeter has an air flow opening micromachined in a silicon substrate (201) by anisotropic chemical etching, and bridged by two beams (202A & 202B), as shown in FIGS. 2A and 2B. Each beam has a nickel film resistor (204) along its length, electrically isolated form the underlying silicon by a $SiO_2$ layer (203) and passivated by a $Si_3N_4$ layer (205), but thermally closely coupled to it. Aluminum leads make contact with these resistors and connect to four bonding pads (206) on one edge of the chip. On beam (202A) is heated via its resistor by means of a control circuit. The other beam (202B) is unheated and serves as an ambient-temperature reference for temperature compensation.

With this type of flowmeter, the above mentioned problems (2), (3), and (4) remain to be solved. In addition, large cross-section area of the beams degrades the performance of the flowmeters such as sensitivity and response time.

In the third type, a flowmeter, as shown in FIG. 3, is made of a silicon substrate (301) having a central circular region and an outer annular region on one side and a cap (306) having two cavities (307) and (308). A heating element (303) is disposed in the central circular region and at least one thermometer component (304) is disposed in the outer annular region of the silicon substrate (301). The two regions are insulated from each other by a ring region of oxidized porous silicon (305). The flowmeter is adapted to receive the flow of fluid over side of the substrate which has a micromachined cavity (302).

This type of flowmeter also has several problems.

Firstly, the manufacturing process of the flowmeters involves two substrate-processing and then bonding the two substrates together with specific alignment and bonding tools. This complicated process increases cost greatly.

Secondly, the oxidized porous silicon has thermal expansion characteristics that are different form the silicon. Due to the thermal stress, the devices disposed near the oxidized porous silicon are easy to degrade if the change in the operation temperature is too large.

Thirdly, the recesses of the cap substrate prevent the device substrate from thinning out to a small thickness. If the thickness of the device substrate is less than the depth of the oxidized porous silicon region, the lateral thermal isolation between the central region and the outer annular region cannot be realized very well.

Fourthly, since the cap substrate covers the front surface of the device substrate, it is difficult to adapt an electrical connection to the external circuit.

SUMMARY OF THE INVENTION

An object of the present invention is to provide a micromachined thermal flowmeter in which the heating element and the temperature sensing element are formed in thin crystal silicon islands that are jutted into the flow of a fluid to be measured for achieving higher sensitivity and accuracy, faster response, lower input power, and more roust structure.

Another object of the present invention is to provide a micromachined thermal flowmeter in which the heating element and the temperature sensing element do not contact with the fluid to be measured in order to avoid them suffering problems of abrasion, corrosion, and contamination.

Still another object of the present invention is to provide a micromachined thermal flowmeter which the fluid to be measured flows over a flat surface without any recesses in it in order to avoid disturbing the flow.

Still another object of the present invention is to provide a micromachined thermal flowmeter in which the surface faced with the fluid to be measured can be coated with a corrosion-resistance and abrasion resistant layer in order to prolong the period of the operation of the flowmeter.

Still another object of the present invention is to provide a micromachined thermal flowmeter than can be fabricated by using standard integrated circuit technology with a small modification to achieve high cost-effectiveness.

The above and other objects are achieved by a micromachined thermal flowmeter in accordance with the present invention.

BRIEF DESCRIPTION OF THE DRAWINGS

FIG. 1 is a cross-sectional view of a first conventional micromachined thermal flowmeter;

FIG. 2 is a top plan view of a second conventional micromachined thermal flowmeter;

FIG. 2B is a cross-sectional view of the micromachined thermal flowmeter of FIG. 2A;

FIG. 3 is a cross-sectional view of a third conventional micromachined thermal flowmeter;

DETAILED DESCRIPTION OF THE PREFERRED EMBODIMENTS

Figure 4A:
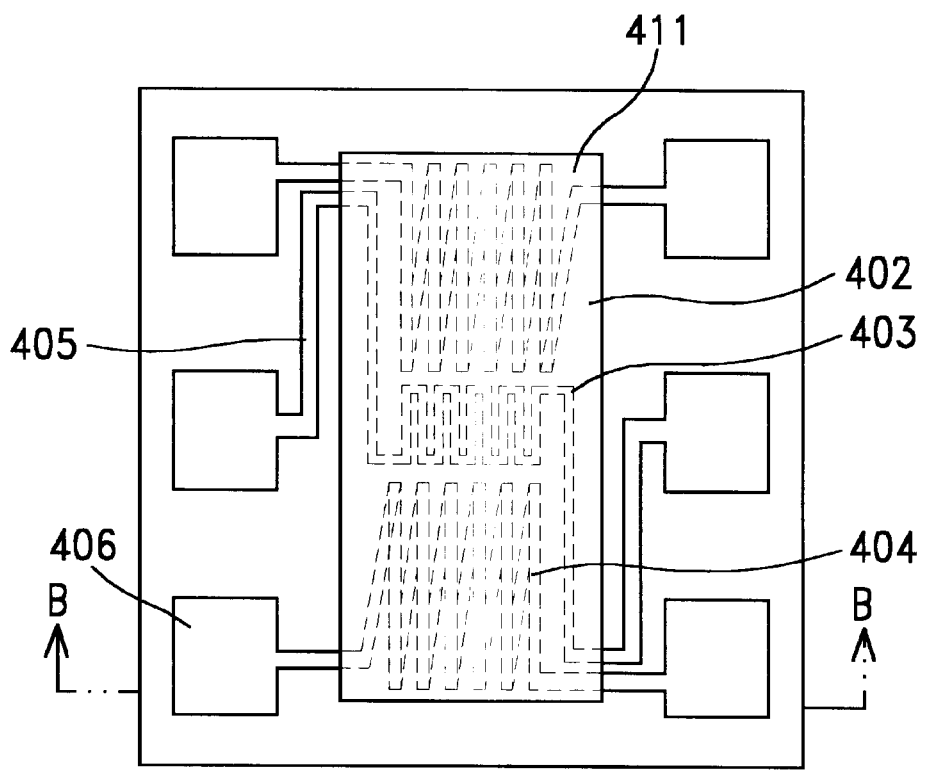
FIG. 4A is a top plan view of a first embodiment of the micromachined thermal flowmeter according to the present invention.
Figure 4B:
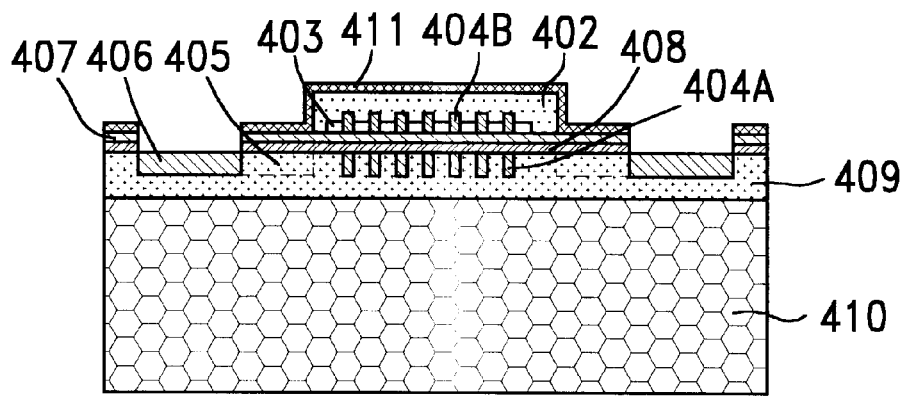
FIG. 4B is a cross-sectional front view of the micromachined thermal flowmeter of FIG. 4A taken along the section line B—B.

Referring to FIGS. 4A and 4B, a preferable embodiment of a micromachined thermal flowmeter according to the present invention comprises:

essentially a thin rectangular single crystal silicon island (402) jutted into the flow of a fluid to be measured for increasing the sensitivity and accuracy having an outside surface toward the flow of a fluid and a base surface opposite to the outside surface;

a low thermal conductivity polyimide layer (409), in which the silicon island (402) is embedded with the base surface thereon;

a low thermal conductivity rigid glass plate (410) for supporting the polyimide layer (409);

a heating resistor (403) of heating element formed laterally through a center region of the silicon island (402) on the base surface thereof;

two thermopiles (404) of thermal sensing elements symmetrically disposed in two longitudinal opposite side regions of the silicon island (402), where each thermopile (404) consists of a plurality of semiconductor electrodes (404B) formed on the base surface of the silicon island (402), a plurality of metal electrodes (404A) inlaid on the polyimide layer (409), and wiring through a $SiO_2$ insulating layer (407) and a $SiN_4$ layer (408);

three pairs of metal conducting stripes (405) and metal bonding pads (406) disposed opposite to two lateral sides of the silicon island inlaid on the polyimide layer (409) for connecting the heating resistor (403) and thermopiles (404) electrically to an external circuit; and a silicon nitride layer (411) coated on the outside surface of the silicon island (402) which faces the flow of a fluid to be measured to protect the surface from damage by the fluid.

When the flowmeter provided by the present invention is in use, the central region of the silicon island (402) is heated and maintained at a constant temperature. A fluid to be measured is allowed to pass over the outside surface of the silicon island (402), increasing the convection heat flow and the input power required to maintain the central region temperature. This increased electrical drive is used to indicate the flow velocity of the fluid.

The flow sensitivity is dependent of the no-flow steady-state heat dissipation and the flow-related heat dissipation. The no-flow steady-state heat dissipation can be made small through the following ways.

(1) The silicon island can be fabricated as thin as 2–3 $\mu$m thick to provide very high lateral thermal resistance.

(2) The thermal conduction co-efficient of polyimide, glass, and silicon are 0.17 W/m.k., 1.4 W/m.k., and 150 W/m.k., respectively both the co-efficient of the polyimide and the glass are much less than that of the silicon. The thermal resistance from the heating resistor to the supporting plate is much lower than that from the heating resistor to the fluid and therefore the flow sensitivity of the flowmeter is mainly dependent of the velocity of the fluid.

Referring now to the drawings, form FIG. 5 to FIG. 14, there are cross-sectional views showing a method for fabricating a micromachined thermal flowmeter according to the fist embodiment of the present invention.

Figure 5:
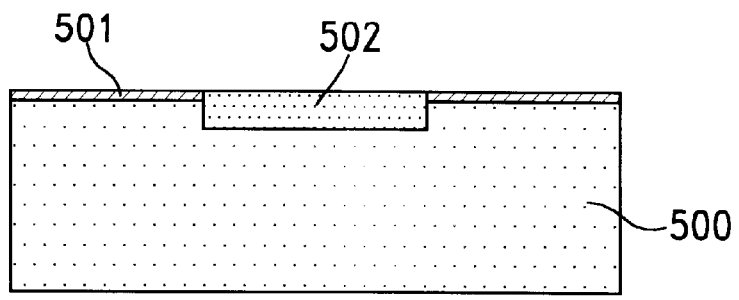
FIG. 5 to FIG. 14 are cross-sectional views showing a method for fabricating a first embodiment of a micromachined thermal flowmeter according to the present invention; and, FIG. 15 is a cross-sectional view showing a second embodiment of a micromachined thermal flowmeter according to the present invention.

In FIG. 5, a single side polished of a surface roughness number 1000 p-type silicon wafer (500) is lightly doped with boron to a resistivity of about 1 $\Omega$-cm. A 6500 Å-thick $SiO_2$ layer (501) is grown on the surface of the wafer (500) by thermal oxidization is wet $O_2$ at 1000° C. Ion implantation windows are formed in the $SiO_2$ layer (501) by a first photoresist process. Another 700 Å-thick $SiO_2$ layer is grown in the window regions by thermal oxidization in wet $O_2$ at 1000° C. Phosphorus ion implantation is performed at energy 100 kev with dose 3–4×10$^{13}$/cm$^2$. Drive-in is performed in dry $N_2$ at 1200° C., resulting in a n-type region (502) having a junction depth of about 6 $\mu$m and a sheet resistance of about 2–3 ohms per square. This ion implantation region is designated to define a thin n-type single crystal silicon island (402).

Figure 6:
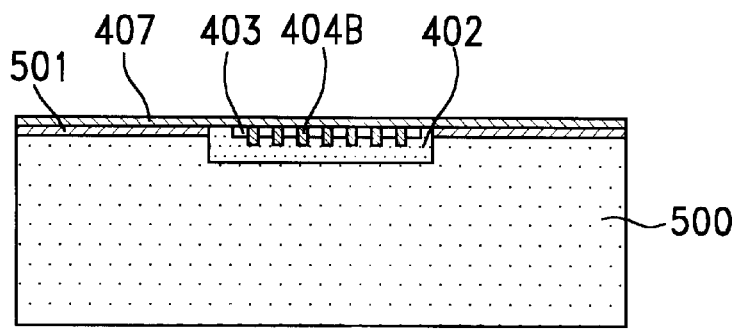

In FIG. 6, all the residual $SiO_2$ on the surface of the wafer (500) is removed by etching in a mixture of 907 g $NH_4F$+ 400 g $H_2O$+325 ml HF+450 ml $H_2$. A new 700 Å-thick $SiO_2$ layer (407) is grown on the surface of the wafer (500) by thermal oxidation in wet $O_2$ at 1000° C. An ion implantation pattern is formed by a second photoresist process. Using the pattern as a mask, boron ion implantation is performed at energy 100 kev with dose 10$^{15}$/cm$^2$. Drive-in is performed in dry $N_2$ at 950° C., resulting in p$^+$-type regions having sheet resistance of about 90 ohms per square in the n-type silicon island (402). These ion implantation regions are designed to form a heating resistor (403) and the semiconductor electrodes (404B) of thermopiles.

Figure 7:
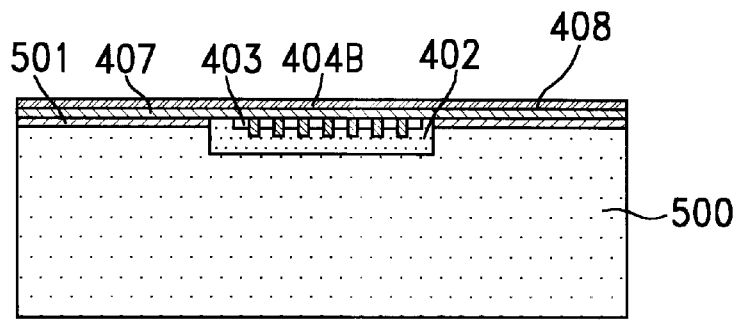

In FIG. 7, a 1500 Å-thick $Si_3N_4$, layer (408) is grown on the surface of the $SiO_2$ layer (407) and the wafer (500) by chemical vapor deposition (CVD) at 750° C. This $Si_3N_4$, layer (408) is designed to be a passivation, etching stop, and HF-resistant layer.

Figure 8:
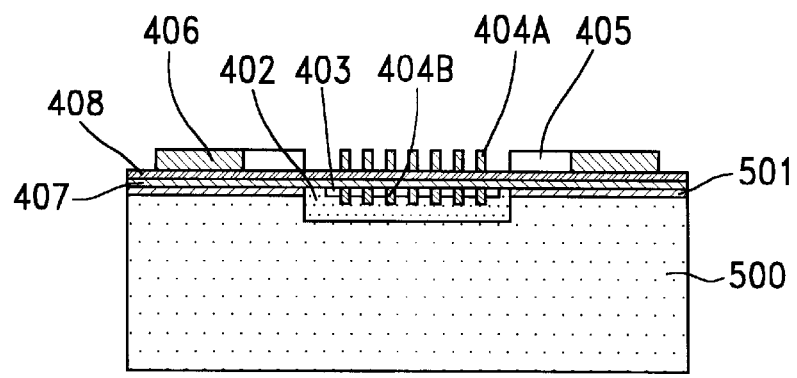

In FIG. 8, contact holes are formed in the $Si_3N_4$, layer (408) and the $SiO_2$ layer (407) by a third photoresist process.

A 1.2 μ-thick Al layer is formed on the surface of the wafer (500) by electron beam evaporation. A pattern is formed in the Al layer by a fourth photoresist process, resulting in interconnection, bonding pads (406), conducting stripes (405), and the metal electrodes (404A) of the thermopiles. Annealing is performed in dry $N_2$ at 450° C.

Figure 9:
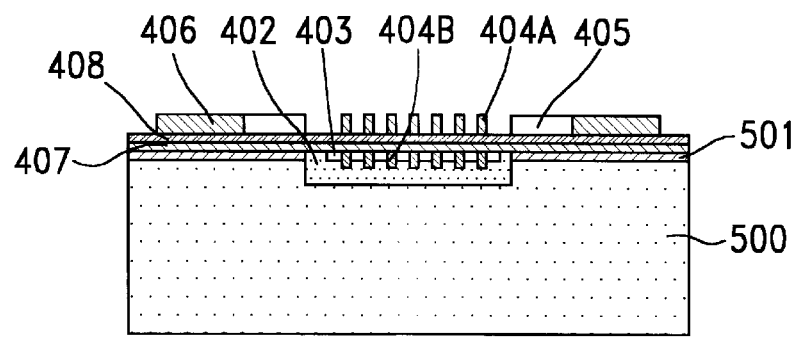

In FIG. 9, a fifth photoresist process is performed to remove all the residual $Si_3N_4$ and $SiO_2$ except for on the surface of the interconnection, the pads (406), stripes (405), and the n-type silicon island (402).

Figure 10:
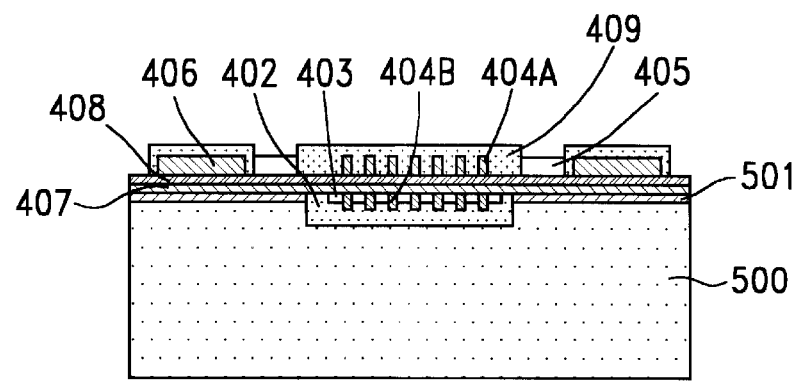

In FIG. 10, an anodization mask layer is formed on the surface of the wafer (500). The anodization mask layer can be made of polyimide, Au/Cr, Ni/Cr, Cu/Cr, and other HF-resistant materials. Polyimide is preferably used as a anodization mask material and spin-coated on the surface of the wafer (500) at 4 k rpm for 30 s to form a polyimide layer (409). The polyimide is soft-baked for 30 min at 135° C. and cured for 1 h at 400° C. A sixth photoresist process is performed to form anodization windows in the polyimide layer (409). Using the resist pattern as a mask, the polyimide in the window regions is removed by $O_2$ plasma etching. The $Si_3N_4$ of layer (408) in the window regions is removed by reaction ion etching (RIE), and the $SiO_2$ of layer (407) in the window regions is removed by etching in a mixture of 907 $gNH_4F$+400 $gH_2O$+325 ml HF+450 $mlH_2$.

Figure 11:
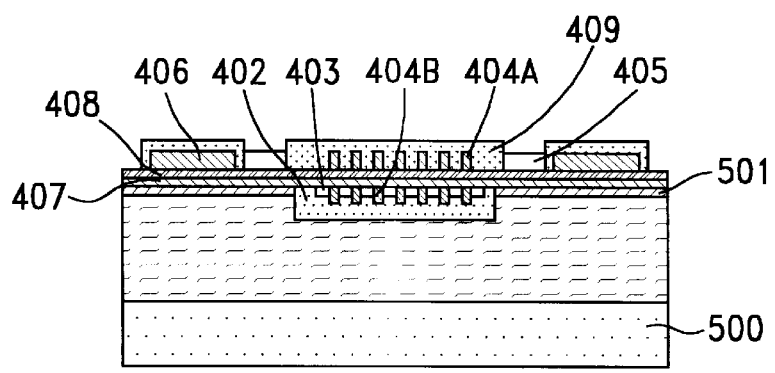

In FIG. 11, anodization is performed in a concentrated HF solution to grow porous silicon layer (409) in the wafer (500). The required anodic voltage for forming porous silicon in n-type silicon is higher than the required anodic voltage for forming porous silicon in p-type silicon. Therefore, porous silicon can selectively be formed in the p-type regions of the wafer (500) by controlling the anodic voltage. The p-type silicon under the ion implantation formed n-type silicon island (402) and metal layer (406) and (405) can be converted into porous silicon because of the lateral spread effect of the anodic current. The lateral spread effect is dependent of the resistivity of the silicon wafer used. For a p-type silicon wafer with a resistivity of 1 Ω-cm can form a 40–80 μm-wide lateral spread region. A used HF solution is a mixture of 25% HF, 25% $H_2O$, and 50% $C_2H_5OH$ and a used anodic current is 50 $cm^2$. Under these conditions, a formed porous silicon layer is about 50 μm-thick.

Figure 12:
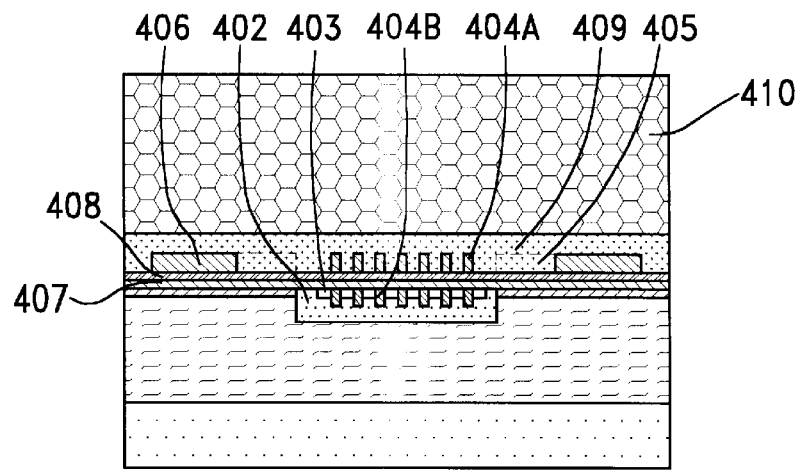

In FIG. 12, all the residual polyimide is removed by $O_2$ plasma etching. A new-5–10 μm-thick polyimide layer (409) is formed on the surface of the wafer (500). A 200 μm-thick microcrystalline glass plate (410) is mounted on the surface of the polyimide layer (409) using polyimide as an adhesion layer. The wafer (500) is heated to 350° C. for 2 h to cure the polyimide.

Figure 13:
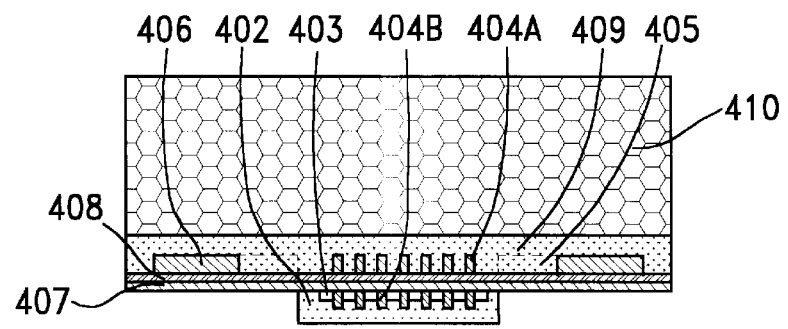

In FIG. 13, the wafer (500) is thinned to expose the porous silicon layer (509). The porous silicon layer (509) is removed by selective etching in a 5% NaOH solution at room temperature. Since the ion implantation formed n-type region (402) has not converted into porous silicon, it cannot be attacked by NaOH solution. The metal layer also cannot be attacked by NaOH solution, because it is protected by the $SiO_2$ (407)/$Si_3N_4$ (408) composite layer.

Figure 14:
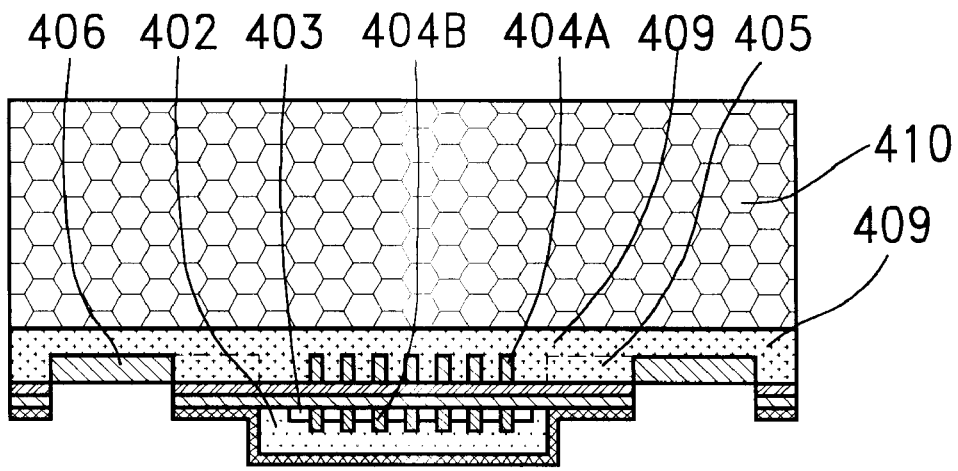

In FIG. 14, a 1500 Å-thick $Si_3N_4$ layer (411) is formed by CVD at 450° C. The harnesses of $Si_3N_4$ and silicon are 3486 $g/mm^2$ and 820 $g/mm^2$, respectively. $Si_3N_4$ is much harder than silicon and preferably used for preventing silicon from being abraded out. A final photoresist process is performed to remove the $SiO_2$ (407)/$Si_3N_4$ (408) composite layer on the pads (406).

Figure 15:
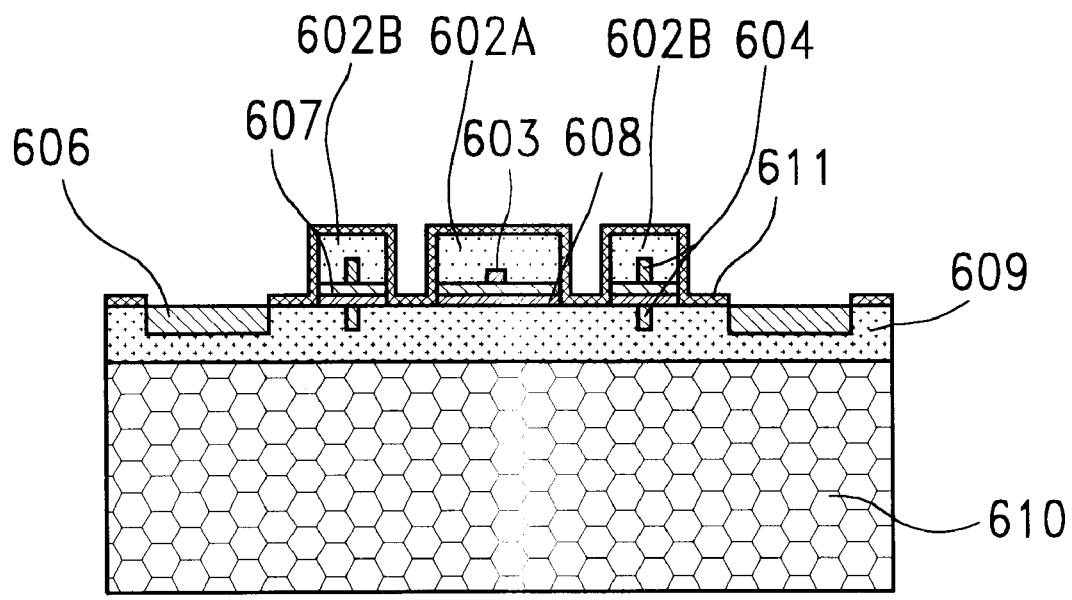

A second embodiment of a micromachined thermal flowmeter is shown in FIG. 15, according to the present invention, which comprises three thin single crystal silicon islands (602A) and (602B), a polyimide layer (609), a glass plate (610), a $SiO_2$ layer (607), a hard $Si_3N_4$ layer (608), bonding pads (606), a heating resistor (603), two temperature sensing elements (604), and a soft $Si_3N_4$ layer (611). In this embodiment, three thin silicon islands, instead of one thin silicon island (602A) are used for forming a heating element (603) and each of the other two islands (602B) is used for forming a thermopile (604).

While the present invention has been described with reference to particular embodiments of the micromachined thermal flowmeters, it is obvious that other embodiments can be used without departing from the teachings. Obviously, many modifications and variations are possible in light of the above teaching. It is therefore to be understood that within the scope of the appended claims, the present invention may be practiced otherwise than as specifically described.

What is claimed is:

1. A micromachined thermal flowmeter comprising:

at least one rectangular thin single crystal silicon island jutted into a flow of a fluid to be measured having a heating element disposed laterally passing therethrough at a middle and two temperature sensing elements disposed in parallel with said heating element at two opposite sides thereof, a base surface of said single crystal silicon island being embedded in a low thermal conductivity elastic layer supported by a low thermal conductivity rigid layer, an outside surface of said single crystal silicon island opposite to said base surface having a corrosion resistant and abrasion resistant layer coated thereon, and three pairs of metal conducting strips with three pairs of metal bonding pads disposed opposite to two sides of said silicon island inlaid on said elastic layer for respectively connecting said heating element and said temperature sensing elements to an external circuit therefore.

2. A micromachined thermal flowmeter according to claim 1 wherein said heating element is a resistor formed of a p-type wiring.

3. A micromachined thermal flowmeter according to claim 1 wherein said temperature sensing elements are thermopiles.

4. A micromachined thermal flowmeter according to claim 1 wherein said low thermal conductivity elastic layer is made of polyimide.

5. A micromachined thermal flowmeter according to claim 1 wherein said low thermal conductivity rigid layer is made of glass.

6. A micromachined thermal flowmeter according to claim 1 wherein said corrosion-resistance an abrasion-resistance layer is made of silicon nitride.

* * * * *